United States Patent
Amann et al.

(10) Patent No.: US 6,563,113 B1
(45) Date of Patent: May 13, 2003

(54) MICROSCOPE, ESPECIALLY A FLUORESCENCE MICROSCOPE, PARTICULARLY A STEREO FLUORESCENCE MICROSCOPE

(75) Inventors: Thomas Amann, Maeder (AT); Jurij Sterban, Heerbrugg (CH); Ruedi Rottermann, Berneck (CH); Peter Soppelsa, Balgach (CH); Heinz Zimmermann, Balgach (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 0 days.

(21) Appl. No.: 09/486,702
(22) PCT Filed: Sep. 3, 1998
(86) PCT No.: PCT/EP99/05587
§ 371 (c)(1),
(2), (4) Date: May 4, 2000
(87) PCT Pub. No.: WO99/13370
PCT Pub. Date: Mar. 18, 1999

(30) Foreign Application Priority Data

Sep. 5, 1997 (CH) .............................................. 2090/97

(51) Int. Cl.[7] .................................................. G02B 7/02
(52) U.S. Cl. ...................................... 250/309; 359/380
(58) Field of Search .............................. 250/309, 234, 250/235, 236, 201.3, 205, 359; 359/381, 380, 388, 389, 390, 385, 368, 350

(56) References Cited

U.S. PATENT DOCUMENTS

| | | | | |
|---|---|---|---|---|
| 4,697,893 A | * | 10/1987 | Fehr et al. .................. | 350/516 |
| 4,756,611 A | * | 7/1988 | Yonekubo et al. .......... | 350/509 |
| 4,783,159 A | * | 11/1988 | Takagi et al. ............... | 350/516 |
| 5,140,458 A | * | 8/1992 | Takagi et al. ............... | 359/380 |
| 5,585,964 A | * | 12/1996 | Schalz ........................ | 359/368 |
| 5,841,577 A | * | 11/1998 | Wachman et al. .......... | 359/386 |
| 5,861,982 A | * | 1/1999 | Takahama et al. .......... | 359/381 |
| 5,865,829 A | * | 2/1999 | Kitajima ..................... | 359/351 |

FOREIGN PATENT DOCUMENTS

| | | |
|---|---|---|
| EP | 0 482 340 | 4/1992 |
| GB | 2 102 149 | 1/1983 |
| GB | 2 251 701 | 7/1992 |

* cited by examiner

*Primary Examiner*—John R. Lee
*Assistant Examiner*—Anthony Quash
(74) *Attorney, Agent, or Firm*—Foley & Lardner (57) ABSTRACT

The invention relates to a novel type of microscope with an illuminating beam which is guided through the magnification power changer with optimized light intensity parallel to the observation beam. The invention specifically relates to a stereo fluorescence microscope comprising a set of quickly replaceable filters in interchangeable filter carriers. The novel design offers good light efficiency on the object. Malfunctions occurring as a result of intrinsic reflections or fluorescence phenomena inside the microscope are avoided.

28 Claims, 9 Drawing Sheets

MICROSCOPE, ESPECIALLY A FLUORESCENCE MICROSCOPE, PARTICULARLY A STEREO FLUORESCENCE MICROSCOPE

The invention relates to a microscope according to the preamble of claim 1. This is essentially a novel type of illuminating system for microscopy. The advantages and application possibilities of the invention for lighting of any type in the field of microscopy are plain to the person skilled in the art. However, in a way that is representative of the most varied types of illumination, consideration is given below, in particular, to the distinguishing features in the field of illumination by means of fluorescent light for which the invention is preferably to be put to use. Although the invention is advantageous for the most varied types of microscopes, stereomicroscopes will be considered below in particular.

Ploem's reflected light principle is frequently employed for fluorescence microscopy. The discovery of the green fluorescing protein GFP (Green Fluorescent Protein) has produced a need for fluorescence stereo microscopy, because the non-toxic GFP can also be used to investigate living organisms. Thanks to the upright, non-reversed and three-dimensional image and to the large working distance, the stereomicroscope is better suited for this purpose than the classic 2D microscope. The latter is represented, for example, in the Leica company document 913894. The following solutions are known for fluorescence microscopy using 3D microscopes:

a) Separate Illumination:

The observer uses a conventional stereomicroscope. A blocking filter is inserted into the observation beam paths at a suitable point. This can be a filter which covers both beam paths, or one filter each in the two beam paths of the stereomicroscope. The illumination of the object is performed independently—for example to the side—of the stereomicroscope optical system. The exciter filter is arranged in the illuminating beam path. Such a design is to be found, for example, in DE-A-2348567, an annular light tube being applied there which surrounds the main objective and, for its part, is shielded from the surroundings by a bellows. A transmitted-light microscope with fluorescent illumination toward the objective has, for example, been marketed under the designation "Leitz Fluoreszenz Mikroskop mit Orthomat" ["Light Fluorescence Microscope with Orthomat"].

b) Illumination by the Stereomicroscope:

A Ploem fluorescent illuminator having an exciter filter, a dichromatic beam-splitting mirror and blocking filter is arranged in each beam path between the magnification power changer and the binocular tube of the stereomicroscope. It suffices if the illumination is coupled only into one of the two beam paths. There is then no need for the exciter filter in the other beam path. The dichromatic beam-splitting mirror and/or the blocking filters can be combined to form one component which covers both beam paths. Such a system is described, for example, in the company documents: "Leica Stereo-Fluoreszenzsystem" [Leica Stereo Fluorescence System"] (printed publication No.: M1-203-3de; IV.96) and "Leica-Stereo-Fluoreszenzsystem" ["Leica Stereo Fluorescence System"] (printed publication No.: M1-203-4de; IV.96), and is likewise represented in an earlier Leica company document (printed publication No.: M1-143-4de; II.97).

Units for non-fluorescing illumination through the microscope are also represented, for example, in documents U.S. Pat. No. 3,512,860, DE-A-3 339 172 and DE-A-3 427 592. In the design in accordance with the first and second citations, light is reflected directly into the observation beam path via beam-splitting mirrors upstream of or through the main objective; in the case of the design in accordance with the third citation, an illuminating beam path is directed onto the object next to the main objective obliquely relative to the observation beam path. Comparable to the second citation is an illuminating system for the applicant's "M650" stereomicroscope in which the illuminating beam path additionally also has a magnification power changer which is mechanically coupled to the magnification power changer of the observation beam paths, with the result that both the image field illumination and the brightness are adapted to the respective magnification power, as represented, for example, in the Leica company document with the printed publication no.: M1-601-0fr; IX.94.

This prior art has the following disadvantages:

a) In the Case of Separate Illumination:

In the event of a change in the magnification power, the illuminating optical system is not adapted to the changing size of the object field. Consequently, in the case of weak magnification only a portion of the object field is illuminated and/or in the case of high magnification invisible object paths are also needlessly illuminated. Consequently, the illumination level is lower in the case of a high magnification power than if the entire luminous flux were concentrated onto the small object field.

b) In the Case of Illumination Through the Stereomicroscope:

In the magnification path changer, the exciting light floods the same optical components which are also used to observe the fluorescing object. This requires all these optical components to have a high transparency to UV and blue light, and to be free from autofluorescence. Depending on the selected magnification power, it is also possible for parts in the surrounding field of the lenses also to be undesirably irradiated with exciting light. There, as well, no fluorescent light may be generated. In practice, these requirements can be met only with a high outlay. To date, compromises have been made in equipment design: thus, on the one hand, the illumination level of the object with exciting light is reduced and, on the other hand, undesired fluorescent light which is superimposed on that from the object and thus impairs the image quality is generated in the magnification power changer or in the observation beam path or paths. Moreover, autofluorescence occurring from lens cement, dust and housing parts may cause additional disturbance.

The abovementioned microscopes of the applicant (for example "M650", or else "M690"—with a zoom—), which have a dedicated illuminating beam path with setting of the magnification power, the magnification power changer of the observation beam paths being coupled to the magnification power changer of the illumination beam path such that the object illumination is basically adapted to the respective magnification power, require precisely a spatially separated, additional magnification power changer and a corresponding linkage, for which reason these fittings are very bulky. The application of such a microscope through the replacement of the conventional illumination by a fluorescent light source and appropriate filters has moreover, also not yet been suggested. The point is that the problem of the autoreflection of undesired fluorescent light beams between the main objective and the magnification power changer may also occur in such a case; the reason for this, in particular, is that the illuminating beam path reflected in strikes the main objective at a certain angle which is oblique to the observation beam paths.

It is therefore the aim of the present invention to create a microscope having an optimized illuminating beam path, in particular to create a microscope, preferably a stereomicroscope, for observing fluorescing objects which avoids the disadvantages of the state of the art. In particular, the aim is to adapt the object illumination with exciting light to the magnification power respectively selected. In addition, the illuminating optical system is to be highly transparent to UV light and blue light, and the image quality may not be impaired by autofluorescence internal to the instrument.

It is certainly already regarded as inventive [lacuna] one inventive idea for the purpose of converting a microscope resembling the "M650" or "M690" of the applicant into a fluorescence microscope by replacing the conventional light source with a fluorescent light source and installing appropriate exciting and blocking filters. Such a novel design would still have the advantage that the exciting light falls on the object in a concentrated fashion which is thus economical in application—specifically independently of the respectively selected magnification power of the observation beam paths of these microscopes. However, the invention goes beyond this and also attempts to improve such designs further.

Furthermore, it is proposed according to the invention to supplement the magnification power changer of the stereomicroscope with a third beam path for the exciting light. The two observation beam paths are therefore no longer flooded with the exciting light. Any possible autofluorescence in the illuminating beam path does not disturb the observation. The illuminating beam path can be optimized to provide an improved transparency to UV and blue light, without having to pay regard to the imaging quality of the observation beam path. The exciting light is coupled into the abovementioned third beam path of the magnification power changer in a very simple way; no dichromatic beam-splitting mirror is required for this purpose. The changing device for the exciting filter and the blocking filter can thus be of simpler configuration.

Especially when the coupling-in is performed such that all the beam paths run parallel in the region of the magnification power changer, it is also impossible for disturbing autoreflections to occur on the inside of the main objective, since these would, if appropriate, be retroreflected into the illuminating beam path.

Further advantageous refinements and variants thereon are described in the patent claims and are protected. Additional variants follow from the description of the figures.

The stereomicroscope in accordance with the present invention can be applied both in Greenough stereomicroscopes and in stereomicroscopes having a common main objective.

If a UV safety screen (for example "GG 420") is additionally permanently installed in the observation beam path, the observer is protected against harmful UV light even when the blocking filter is removed.

If the exciting filter and the blocking filter are removed, the object can be observed in the reflected light. Since the illumination strikes the object very steeply, this device is ideal for investigating deep holes. The replacement or the additional arrangement of a normal light source for the illuminating beam path is easy to solve in technical terms. For example, it would also be possible to provide a changeover switch or a capping plate which introduce permanently installed normal light into the illuminating beam path via a beam-splitting mirror, as has been implemented, for example, with the known "LN Galileo" transmitted-light fluorescence microscope.

It is advantageous for the exciting filter and the blocking filter to be changeable independently of one another, in order to be able to provide any desired filter combinations. According to the invention, in this case the filters are mounted on a filter changer, designed as a disk or slide, to form a plurality of sets of exciting and blocking filters. It is possible thereby to switch over quickly between various fluorescence methods. A shutter which is preferably arranged and is driven by the filter disk interrupts the illuminating beam path when a change is made from one filter set to the other. This ensures the safety of the viewer. A slide which is possibly additionally present permits the illuminating beam path also to be interrupted manually. In this way, the microscope can also be used with conventional illumination without disconnecting the light source for fluorescence viewing. This advantageously eliminates waiting during cooling and restarting of the fluorescence lamp.

The filter sets can be operated effectively by being embedded in filter carriers, and are protected against contamination and damage by being held in the filter changer. By contrast with expensive and bulky dichroic mirrors or prisms which have been applied in known instruments as exchangeable filters for reflection into the observation beam path, the flat filter sets according to the invention are more cost-effective and can be installed integrally in an optimum fashion.

The filters are changed without aids, resulting in optimization of the operating speed.

As is known per se, it is possible to connect in parallel with the observation beam path at least one assistant's tube whose beam path is reflected out via at least one partial reflecting surface between the eyepieces of the observation beam path and the filters. Assistants can thereby view the fluorescing object without difficulty.

In order to optimize space (all beam paths in a cylindrical space which is as narrow as possible), in accordance with a particular refinement of the invention the center of the main objective was displaced eccentrically relative to the cross section of this cylindrical space.

The illuminating beam path can also be split up for the purpose of further optimizing space, in which case the axes of the observation beam paths are once again displaced in a radial plane of the cylindrical space. The cylinder diameter can be further reduced in this design.

Alternatively, all the beam paths can jointly penetrate a main objective, or each beam path per se can have a dedicated main objective, which would entirely exclude any disturbing reflections possibly occurring.

If oblique illumination of the object is desired for technical reasons concerning illumination, it is also possible to provide downstream of the main objective an appropriate optical element which directs the illumination appropriately.

To protect the observers and those not involved, it is conceivable to provide concentrically with the main objective a bellows which shields the space between the object and main objective from the outside.

The invention is explained below with reference to examples which have been realized in practice but which are not restrictive. Since one field of application is stereo fluorescence microscopy, it will be demonstrated in particular with reference to a novel exemplary stereo fluorescence microscope. However, it is in no way limited to fluorescence microscopy, but also decidedly comprises all other types of optical microscopy, as will become unequivocally clear to a person skilled in the art upon study of the patent claims. Since the arrangement of the new illuminating beam path is essentially identical in these other types of optical microscopy to the case of fluorescence microscopy, for the person skilled in the art the following description also results in the best method of embodying the invention for these other types, taking account of the respective, known characteristic features of these other types. Thus, for example, in most other types the installation of fluorescence filters or the like is eliminated.

The figures are described inclusively. Identical reference symbols signify identical components; reference symbols with different reference numerals signify components which have the same function but differ in design or position.

The design according to the invention comprises a plurality of inventive solution features which are independent of one another and can also be used independently.

Figure 1:
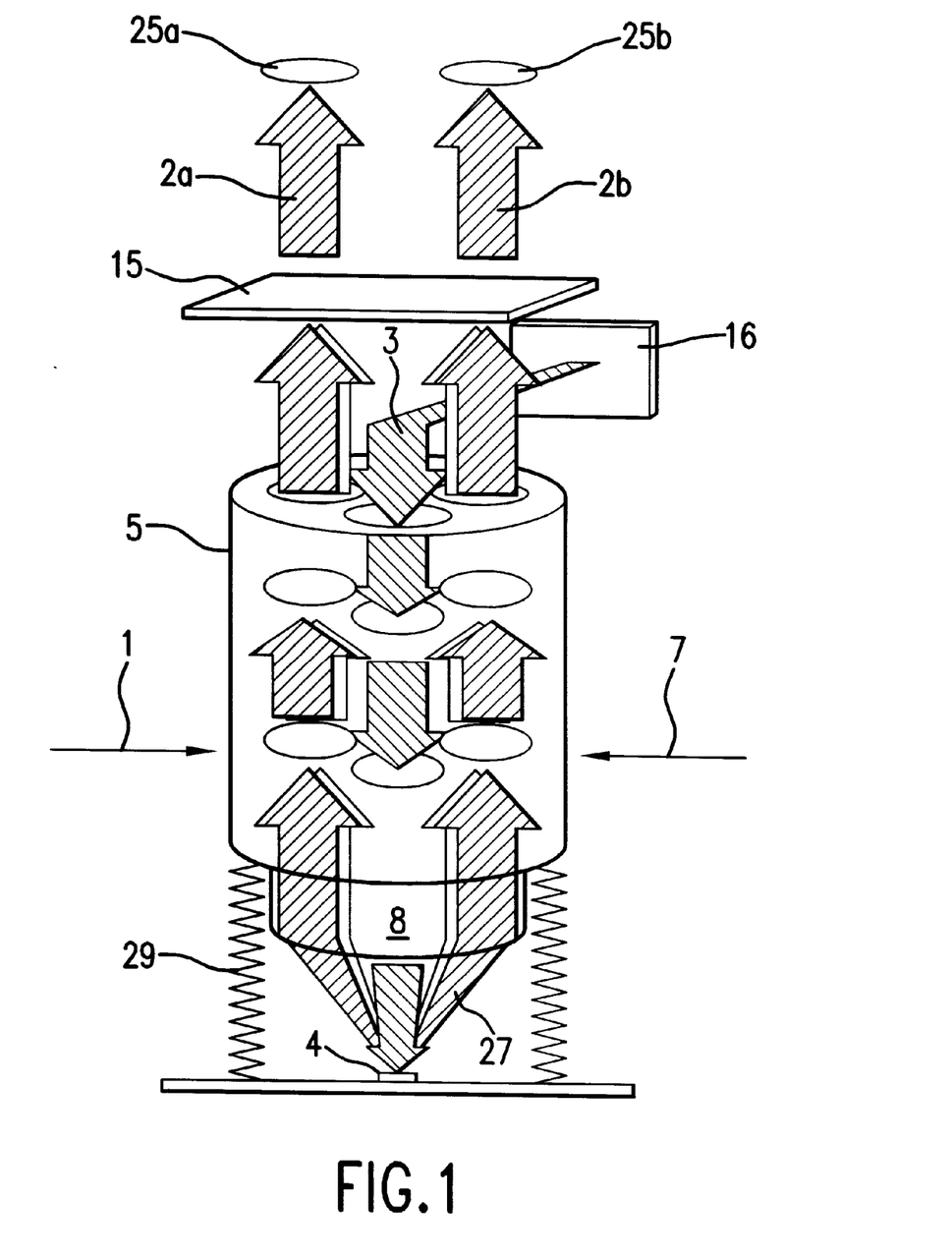
FIG. 1 shows the principle of a novel stereomicroscope with integrated illuminating beam path for fluorescence microscopy.

FIG. 1 shows a conventional stereomicroscope design having observation beam paths 2a and 2b, which direct light 27 from an object 4 through a main objective 8, through a magnification power changer 1 which in this case is designed as a zoom for example, to a binocular tube 25a,b. The magnification power changer 1 comprises in a housing 5 lens slides 7 on which the lenses of the optical system are held. A novel feature of this design is the addition of a third illuminating beam path 3, which is likewise led through the magnification power changer 1 in a fashion parallel to the observation beam paths 2. This illuminating beam path 3 reflects light from laterally [sic], using measures known per se, through dedicated lenses on the lens slides 7 and through the main objective 8 onto the object 4. According to the invention, this is normal illumination or—as in the example illustrated—fluorescent illumination which is set by an exciter filter 16 to a special optical bandwidth. For this fluorescent design a conventional blocking filter 15, which also transmits another specific light bandwidth, is indicated. When looking through the binocular eyepiece 25a,b, an observer can thus detect only that light which originates from the object and by which fluorescent light was excited in the beam path 3 and passed by the blocking filter 15. External viewers standing next to the microscope are shielded for the sake of safety from possibly occurring exciter beams by means of a bellows 29—though this is not mandatory. Instead of a bellows 29, it would also be possible to provide transparent filter disks or the like—as known per se.

Figures 2A, 2B:
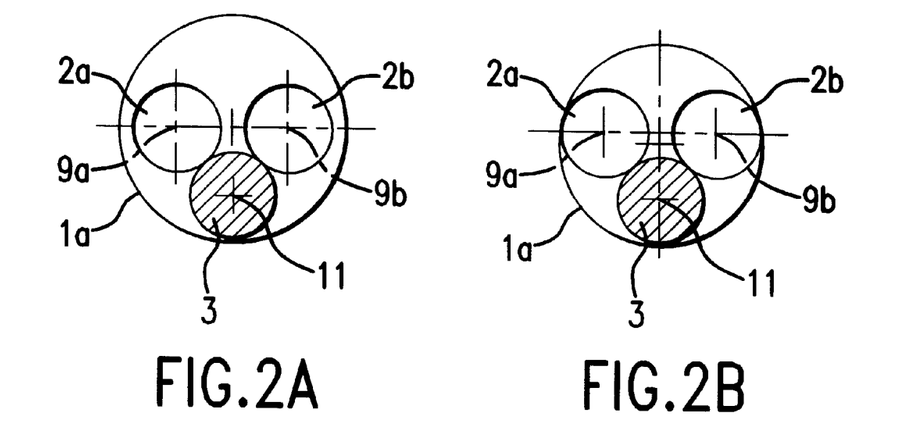
FIGS. 2a and 2b show two variants of the spatial beam path arrangement, FIG. 2b illustrating a particularly space-saving variant according to the invention.

FIG. 2a shows a section through a magnification power changer 1a with a conventional arrangement of the two observation beam paths 2a,b. Their axes 9a,b lie in an axial plane through the cylindrical space, which is circumscribed by the magnification power changer 1a. The result of this is a larger circumference of the space, and thus a bulkier magnification power changer 1a than in the case of the design in accordance with FIG. 2b, in which the axes 9a,b were arranged outside an axial plane. The illuminating beam path 3 admittedly touches the two observation beam paths 2a,b; however, the latter are spaced apart from one another in both variants (FIGS. 2a and b). Alternatively, the two observation beam paths 2a,b could be displaced relative to one another while mutually touching, so that the axes 9a,b form together with axis 11 of the illuminating beam path 3—viewed in section—an equilateral triangle whose centroid (midpoint) coincides with the midpoint of the cylinder cross section. The cylindrical space could be minimized in this way. "Touching" in the sense of the invention signifies juxtaposing the beam paths as close as possible technically.

Although other microscopes (for example: "M840") than those mentioned at the beginning have been disclosed by the applicant, which in addition to the observation beam paths have further parallel beam paths in the magnification power changer, these beam paths serve for observing through possible assistant's tubes or by means of video cameras or the like. However, it has so far clearly not yet been realized among experts what advantages follow from the use of such additional beam paths for illuminating purposes. To this extent, all modifications of such known designs with illuminating beam paths according to the invention are also subsumed under the present invention.

Figure 3:
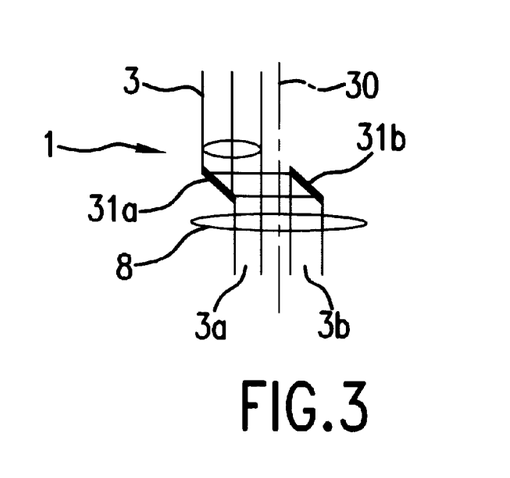
FIG. 3 shows a design with an illuminating beam path split by mirror.

FIG. 3 shows a side view of a further variant, having an illuminating beam path 3a,b split about the optical axis 30 of the main objective 8. By means of two mirrors 31a,b between the main objective 8 and magnification power changer 1, one half 3b of the illuminating beam path 3 is deflected, and the other is directed without being influenced onto the object.

Figure 4:
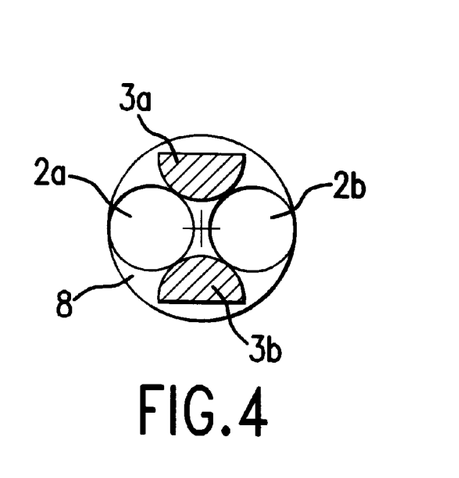
FIG. 4 a section through a design with a split illuminating beam path in the case of a main objective with an optimized diameter.

FIG. 4 shows how a conventional main objective 8 with a diameter optimized for observation can also be used for optimum illumination by splitting the illuminating beam path into two partial beam paths 3a,b. This case retains the symmetrical arrangement of the main objective 8 relative to the observation beam paths 2a,b.

Figure 5:
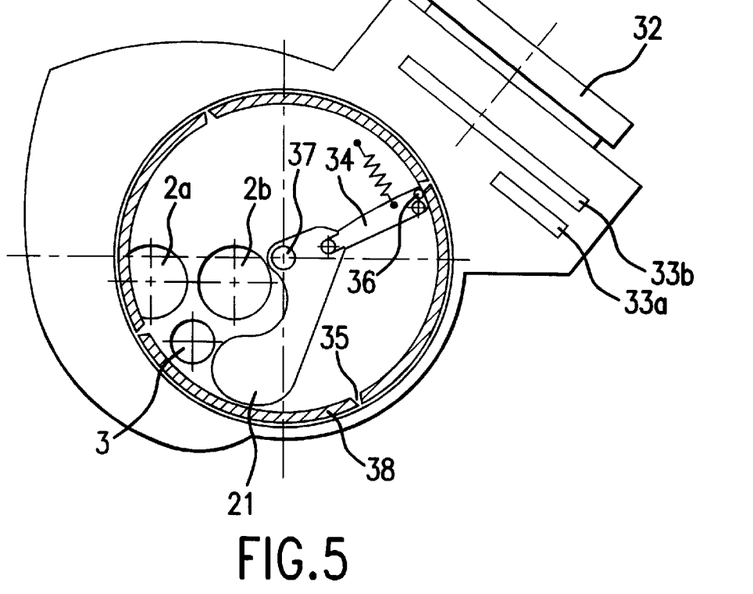
FIG. 5 shows a section through a microscope according to the invention with a shutter for the illuminating beam path.

FIG. 5 shows a section through a microscope as will be described in yet more detail below. A shutter 21 is mounted pivotably about a pivoting axis 37 so that it can optionally expose or cover the illuminating beam path 3. This shutter 21 according to the invention can also be applied independently of this microscope to be described later for the purpose of covering illumination. It is driven by a spring-loaded pivoting mechanism 34 which is supported with the aid of a latching element 36 on a control wall 38. The shutter 21 closes the beam path 3 upon rotation of the control wall 38 about the pivoting axis 37. The illuminating beam path 3 is exposed only in the position shown, when the latching element 36 latches at a latching point 35 on the control wall 38. It is thereby possible to avoid undesired exiting of light. Apart from independent application of this detail of the invention, there is a particular application together with an exchangeable filter carrier 19a in accordance with FIG. 6, to the effect that the shutter 21 opens only when the desired filters 15a–d or 16a–d cross the respective beam paths 2,3. The exchangeable filter carrier 19a, and thus the control wall 38 are rotated about the axis 37 for the purpose of filter selection. This can be done by hand or motor.

Figure 6:
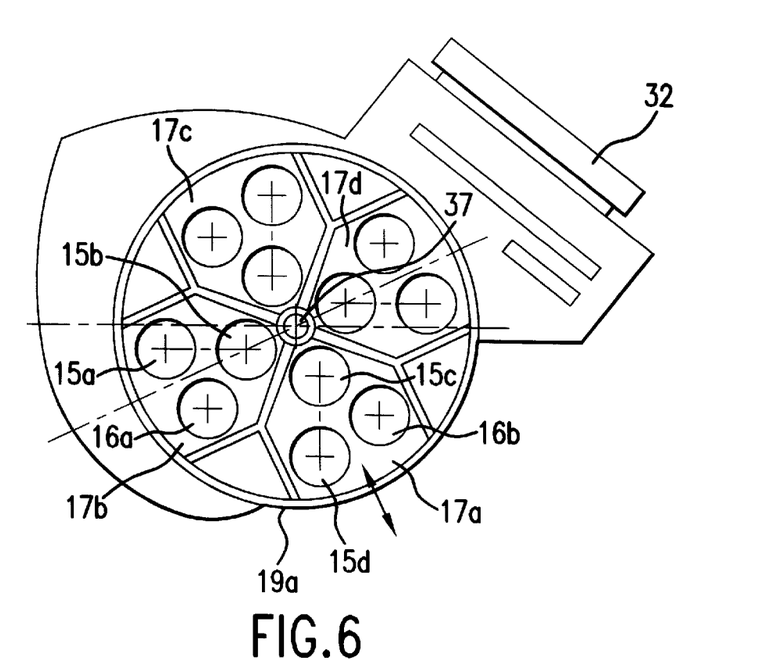
FIG. 6 shows a section comparable with FIG. 5, but somewhat above or below it, with an inserted exchangeable filter carrier.

In accordance with FIG. 6, the exchangeable filter carrier 19a holds filter carriers 17 which in each case have three filters 15 and 16. The filter carriers 17 can be removed and mounted by hand, with the result that a set of filter carriers can exhibit a multiplicity of filter combinations which can be exchanged in each case with particular rapidity. A double arrow signifies the exchange position of a filter carrier 17 which is preferably latched in the exchangeable filter carrier. The exchangeable filter carrier 19a holds four filter carriers 17, moreover, with the result that this approach to a solution according to the invention permits operation which is substantially accelerated and universal. Thus, according to the invention, the exchangeable filter carrier can even be used independently of the remainder of the structure.

Figure 8:
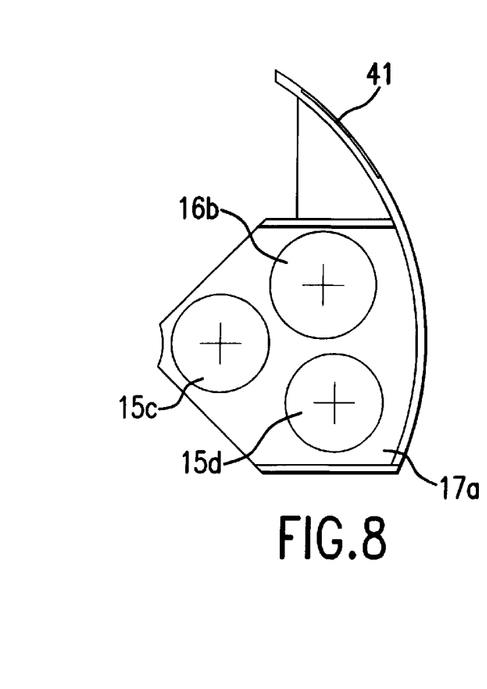
FIG. 8 shows a detail relating to FIG. 6.

An exemplary filter carrier 17a is illustrated enlarged in FIG. 8. The invention provides as a special feature which facilitates the use of the filter inserts an inscription panel 41 which, on the one hand, permits the filter carrier 17a to be deposited where it can be accessed quickly with the aid of a special filter combination and, on the other hand, renders it possible for the user to establish by a brief look through a viewing window or a viewing cutout on the microscope which filter combination is currently in use. The part with the inscription panel 41 serves as a handle at the same time.

Figure 7:
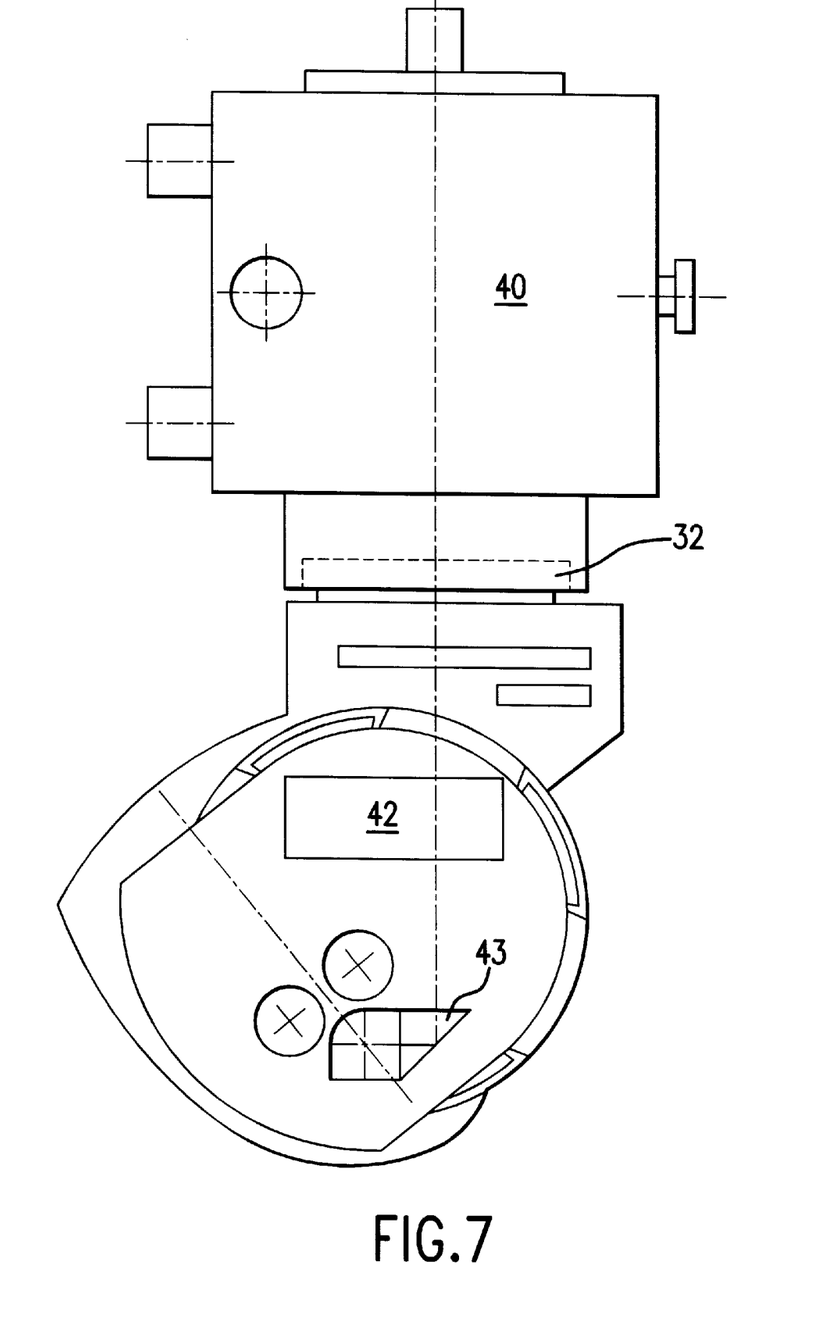
FIG. 7 shows a section comparable to that of FIGS. 5 or 6, but above it, with an insertion prism for the illuminating beam path, and a light source.

In FIG. 7, 32 illustrates a connection to a light source 40, which in the present example is a fluorescent light source or a combination light source, but can also be replaced by a normal light source. Channels 33a,b serve for the insertion of further filters or filter slides or cover slides which optionally cut off the supply of light, for example for the purpose of manipulating the microscope. The light from the light source 40 is transmitted by the latter laterally into the microscope and guided there via a diaphragm 42, which can, if appropriate, be removed and/or exchanged. A prism 43 of appropriate design reflects the light downward into the illuminating beam path 3.

Figure 9:
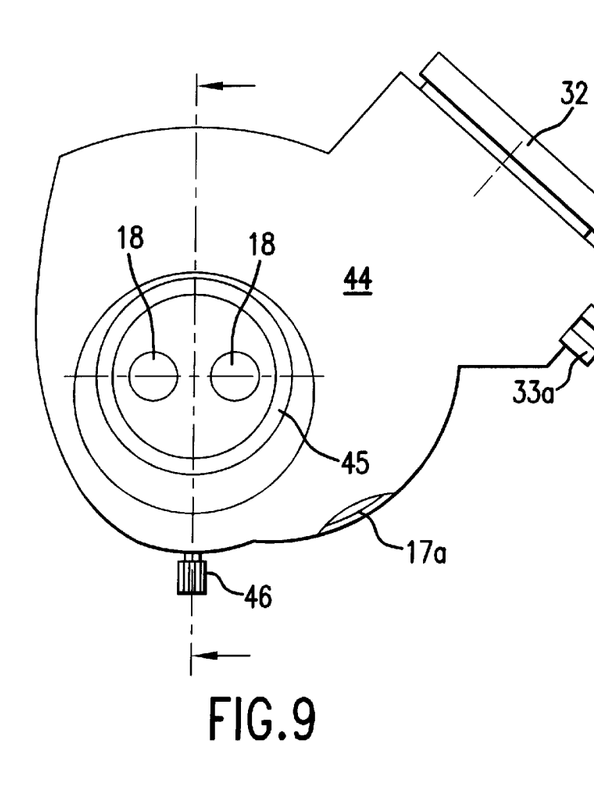
FIG. 9 shows a section comparable to FIG. 7, but somewhat above it.
Figure 10:
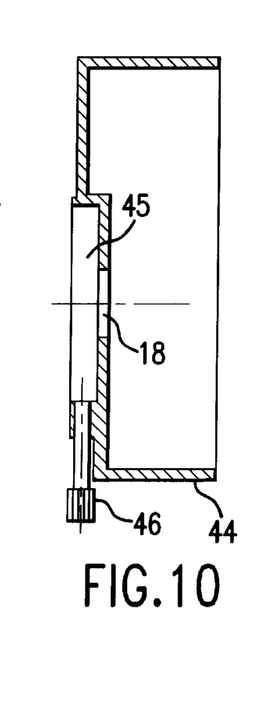
FIG. 10 shows a section through the illustration in accordance with FIG. 9 along the line X—X.

FIGS. 9 and 10 show the binocular carrier 44 with a connection 45 to the microscope, and an additional blocking filter 18, against UV light or the like, which is permanently integrated in said microscope. A clamping screw 46 permits mounting on a universal connection.

Figure 11:
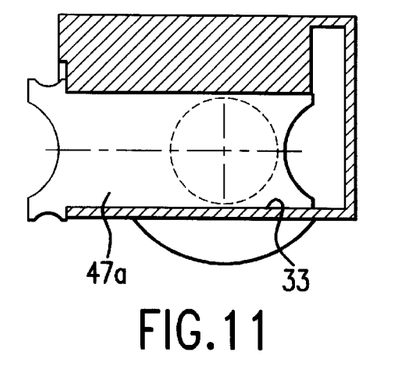
FIGS. 11 and 12 show variants of the blocking slide and attenuating filter for insertion into channels upon connection for the light source.
Figure 12:
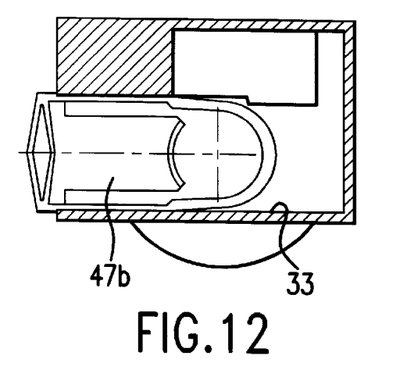

FIG. 11 shows an example of a blocking slide 47a in the channel 33. An alternative to this is shown in FIG. 12, the slide 47b being designed as a filter holder. Also conceivable as an alternative is a gray filter which can be inserted optionally into the channel 33.

Figure 13:
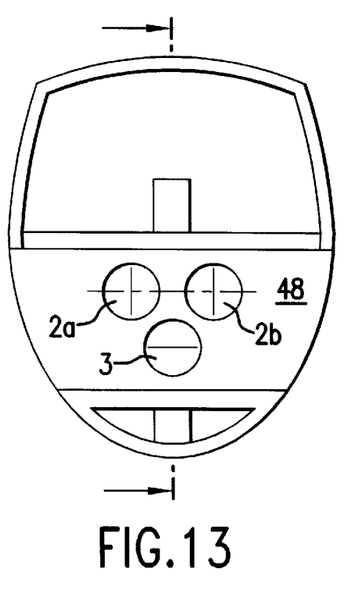
FIG. 13 shows a variant for slidable exchangeable filter carriers, in top view.
Figure 14:
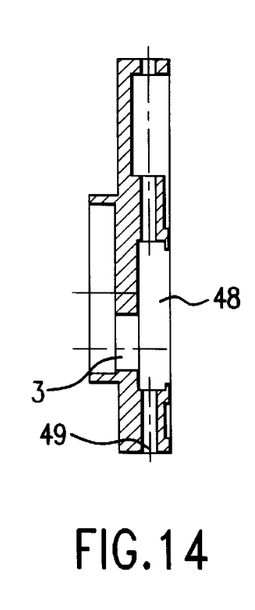
FIG. 14 shows a section through the variant according to FIG. 13, along the line XIV—XIV.
Figure 15:
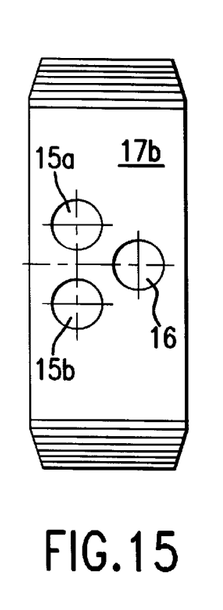
FIGS. 15 and 16a–e show various alternative filter sets.

FIGS. 13 and 14 show an alternative to a rotating exchangeable filter carrier 19a. This design has a rail 48 into which a filter carrier 17b in accordance with FIG. 15 can be inserted laterally. An indicated clamping screw 49 can be used to increase the friction of the filter carrier 17b or to clamp it firmly.

As an alternative to an individual displaceable filter carrier 17b, it is also possible to use laterally displaceable exchangeable filter carriers 19b–h in accordance with FIGS. 16a–e.

Figure 16A:
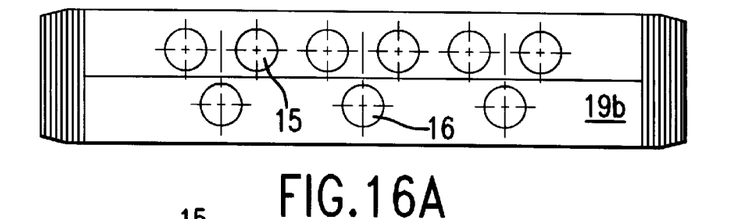
Figure 16B:
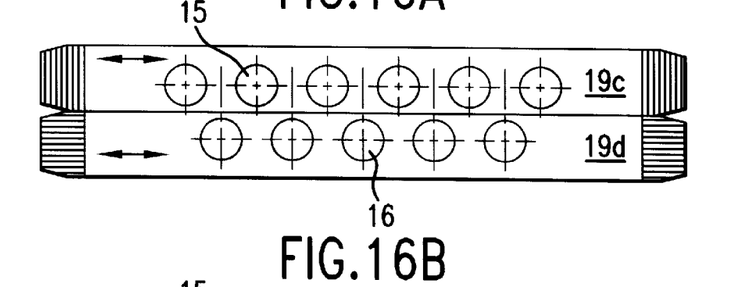
Figure 16C:
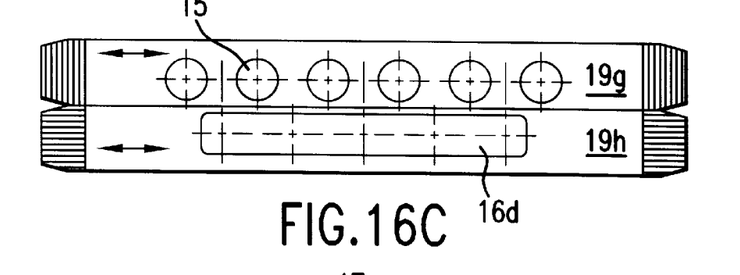
Figure 16D:
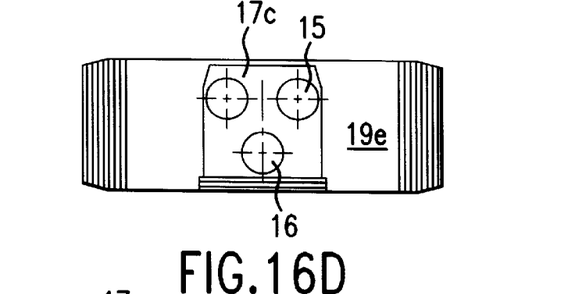

The inventive properties, which can be used independently in each case, of these exchangeable filter carriers are in this case as follows:

FIG. 16a shows three filter sets 15, 16 on an exchangeable filter carrier 19b;

FIG. 16b shows three filter sets 15 and five filters 16 which can be set independently of one another such that a multiplicity of different excitation and/or viewing options.are possible;

FIG. 16c shows three filter sets 15 and a filter 16d which can be displaced laterally independently; the latter is designed as a stepless graduated filter, optical frequency band filter or brightness profile filter;

FIG. 16d shows an exchangeable filter carrier 17c with a filter set 15, 16 and

Figure 16E:
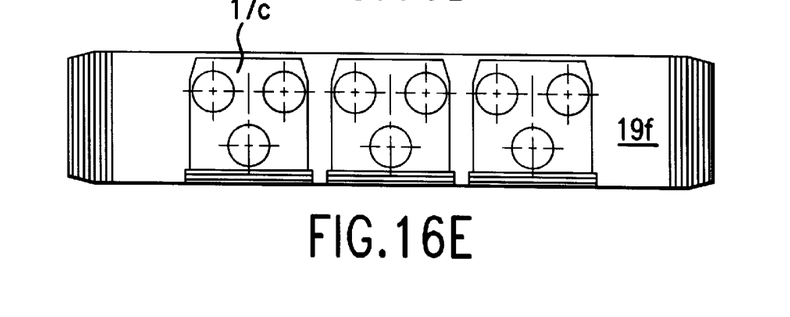

FIG. 16e has three filter carriers 17c—in a way similarly to FIG. 16d. Of course, the number of the respective filter sets is only exemplary. This invention, covers further combinations which, just as in the case of the rotating exchangeable filter carriers 19a, serve to render a microscope according to the invention capable of effective and time-saving operation. The filter sets are also in no way limited to combinations of exciter and blocking light filters. The filter sets according to the invention can also relate to other combinations of colors and/or filters which can be used in microscopy.

Figure 17:
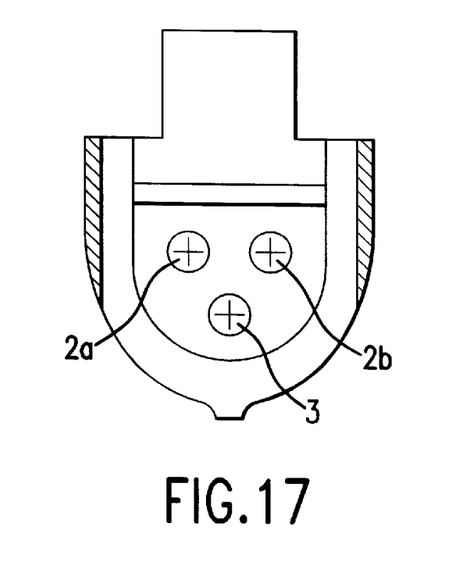
FIG. 17 shows a comparable section through an illustration according to FIG. 7, but below it (in the region of the zoom)
Figure 18:
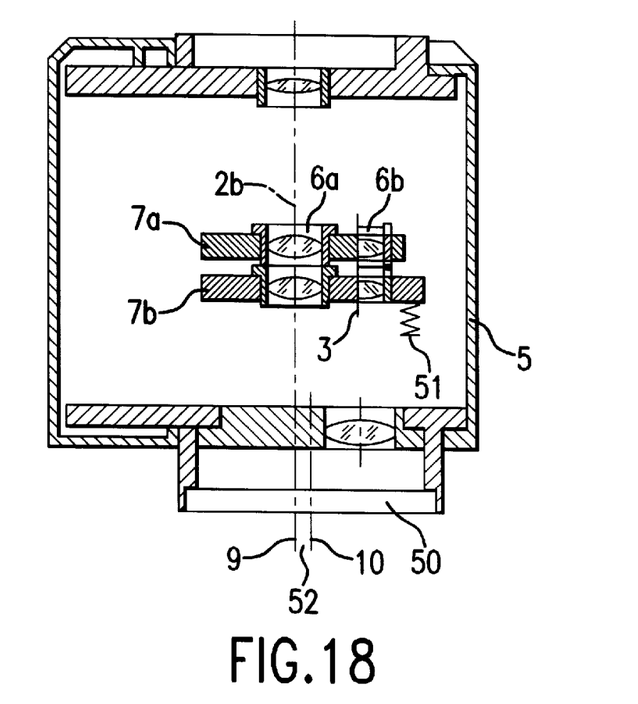
FIG. 18 shows a comparable longitudinal section through a zoom according to the invention.

FIGS. 17 and 18 show a zoom according to the invention having a housing 5 and a connection 50 for the main objective, having lens slides 7a, b which hold zoom elements 6a, b of the beam paths 2 and 3, and having the lateral offset 52 of the axes 9 of the observation beam paths 2 with respect to an axial plane through the axis 10 of a cylindrical space formed by the zoom about the beam paths 2 and 3. The remaining elements which are not shown or illustrated or are only indicated, of this design are known to the person skilled in the art and can, for example, be gathered from a design of a known device of the applicant ("M690"), with the result that there is no need to go into this in more detail here.

Figure 19:
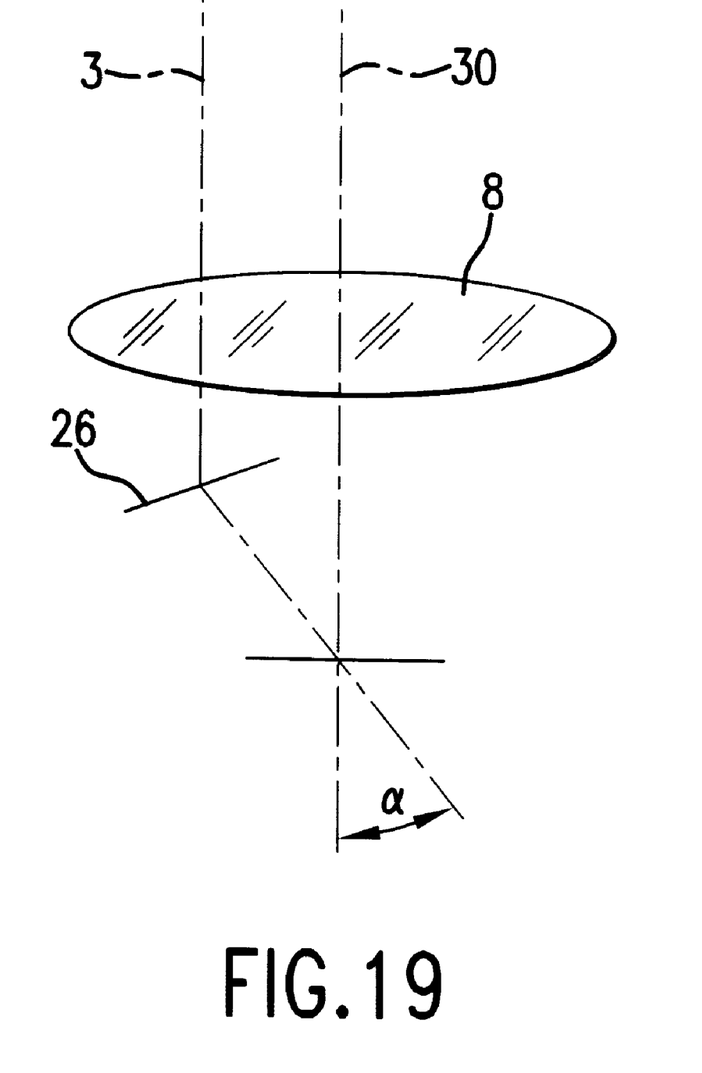
FIG. 19 shows a symbolic design with oblique incidents of light onto the object.

FIG. 19 shows symbolically a design having an illuminating beam path 3 which penetrates the main objective 8 and is thereafter deflected by an optical element 26 relative to the axis 30 of the main objective, in order thereby to achieve an oblique illumination—compare angle $\alpha$. Depending on the type and shape of the optical element (mirror or prisms or the like), the most varied additional effects can be achieved in this case including, for example scattering or the like.

Further details may be gathered from the list of reference symbols and the figures themselves.

List of Reference Symbols 1a,b Magnification power changer
2a,b Observation beam path, observation beam paths
3a,b Illuminating beam path, partial illuminating beam paths, beam path parallel to (2)

4 Object
5 Housing
6 Zoom elements, 6a for (2) and 6b for (3)
7 Lens slides, 7a,b
8 Main objective, 8a,b
9 Axes of the observation beam paths, 9a,b
10 Longitudinal axis of the space
11 Axis of the illuminating beam path
12 Two deflecting mirrors for partial beam paths
13 Illuminating device
14 Fluorescent light source
15 Blocking filters, 15a–d
16 Exciter filters, 16a–d
17 Filter carriers, 17a–c
18 Additional blocking filter
19 Exchangeable filter carriers, 19a–h
20 Holder for (17)
21 Shutter
24 Partial reflecting surface for (23)
25 Eyepiece
26 Optical element
27 emitted light
28 module
29 bellows
30 optical axis of the main objective
31 mirrors 31a,b
32 connection
33 a,b channel for filter slides, 33a,b
34 spring-loaded pivoting mechanism
35 latching points
36 latching element
37 pivoting axis
38 control wall
40 light source
41 inscription panel
42 diaphragm
43 prism
44 binocular carrier
45 connection
46 clamping screw
47 blocking slides, 47a,b
48 rail
49 clamping screw
50 connection
51 spring
52 offset
α angle

What is claimed is:

1. A stereo fluorescence microscope, comprising:
    an exciter filter;
    a magnification changer;
    an objective;
    at least one illuminating beam path; and
    two stereoscopic observation beam paths, wherein the illuminating beam path penetrates the exciter filter, the magnification changer and the objective, wherein the observation beam paths penetrate the magnification changer and the objective, wherein the illuminating beam path and the observation beam paths are parallel, separate and spaced apart from each other within the magnification changer, and
    wherein the magnification changer comprises a first set of lenses to change the magnification of the observation beam paths and a second set of lenses to change the magnification of the illuminating beam path.

2. The stereo fluorescence microscope according to claim 1, wherein said first set of lenses contains a set of lenses for each observation beam path and the second set of lenses contains a set of lenses for the illuminating beam path.

3. The stereo fluorescence microscope according to claim 1, wherein a fluorescent effect is produced by the exciter filter.

4. The stereo fluorescence microscope according to claim 1, wherein neither the observation beam paths nor the illuminating beam path include a dichroic beam splitter.

5. The stereo fluorescence microscope according to claim 1, wherein the blocking filters and the exciter filter lie in a single plane.

6. The stereo fluorescence microscope according to claim 5, wherein the blocking filters and the exciter filter are disposed on a common filter carrier.

7. The stereo fluorescence microscope according to claim 6, wherein the common filter carrier comprises a removable and exchangeable filter carrier.

8. The stereo fluorescence microscope according to claim 5, wherein at least two blocking and exciter filter sets are arranged in a single filter carrier providing for selective engagement of each filter set.

9. The stereo fluorescence microscope according to claim 5, wherein the plane is perpendicular to the observation beam paths.

10. The stereo fluorescence microscope according to claim 7, further comprising a selectively engagable closure disposed in at least one of the illuminating beam path and the observation beam paths, for covering the at least one path or paths during a change of a filter set.

11. The stereo fluorescence microscope according to claim 10, wherein the selectively engagable closure is movably coupled with a common filter carrier.

12. The stereo fluorescence microscope according to claim 7, further comprising:
    a removable fluorescence module disposed on both sides of the stereo fluorescence microscope, said fluorescence module extending across the illuminating beam path and the observation beam paths and including universal connections for microscope fittings, wherein the exchangeable filter carrier is installed in the fluorescence module.

13. The stereo fluorescence microscope according to claim 5, further comprising:
    an exchangeable filter carrier penetrated by all of said beam paths and having at least two different sets of at least one of the exciter filter and blocking filters which are alternatively insertable upstream of a corresponding beam path of the illuminating beam path and the observation beam paths by movement of the exchangeable filter carrier between a first and second position.

14. The stereo fluorescence microscope according to claim 13, wherein the exchangeable filter carrier further includes a light-transmitting position that is free of a blocking or exciter filter.

15. The stereo fluorescence microscope according to claim 13, further comprising a removable fluorescence module in which the exchangeable filter carrier is installed.

16. The stereo fluorescence microscope according to claim 1, wherein the illuminating beam path and the observation beam paths are disposed in a cylindrical space in a region of the magnification power changer, wherein the axes of the observation beam paths lie in a plane which lies parallel to a radial plane, through the longitudinal axis of the cylindrical space, at a distance from this radial plane of approximately 3–5 mm.

17. The stereo fluorescence microscope according to claim 1, wherein the illuminating beam path and the observation beam paths are disposed in a cylindrical space in a region of the magnification power changer, wherein the axes of the observation beam paths are situated at a different distance from the longitudinal axis of the cylindrical space than the axis of the illuminating beam path.

18. The stereo fluorescence microscope according to claim 1, wherein the filters are arranged on a rotatable disk.

19. The stereo fluorescence microscope according to claim 1, wherein respective movable lenses of the magnification changer corresponding to the observation beam paths and the illumination beam path are arranged in common lens carriers.

20. The stereo fluorescence microscope according to claim 1, further comprising an additional UV blocking filter arranged in the observation beam paths.

21. A stereo fluorescence microscope, comprising:
   an exchangeable filter carrier including blocking filters for shortwave light beams and at least one exciter filter for limiting the bandwidth of illuminating fluorescent light;
   a magnification changer having first and second lens sets; and
   an objective,
   wherein a first blocking filter is disposed in a first of two stereoscopic observation beam paths, a second blocking filter is disposed in a second of the two stereoscopic observation beam paths, and the exciter filter is disposed in an illuminating beam path, wherein the observation beam paths and the illuminating beam path are parallel, separate, and spaced apart from each other within the magnification changer.

22. The stereo fluorescence microscope according to claim 21, wherein the first lens set changes the magnification of the observation beam paths and the second lens set changes the magnification of an illuminating beam path simultaneously.

23. The stereo fluorescence microscope according to claim 21, wherein the blocking filters and exciter filter lie in the same plane.

24. The stereo fluorescence microscope according to claim 21, wherein the exchangeable filter carrier includes a first set of blocking and exciter filters and a second set of blocking and exciter filters arranged to provide for selective engagement of each filter set.

25. The stereo fluorescence microscope according to claim 24, wherein said first and second sets are arranged in the same plane.

26. The stereo fluorescence microscope according to claim 21, wherein the exchangeable filter carrier includes a first set of blocking filters and an exciter filter and a different, second set of blocking filters and an exciter filter, arranged at different radial positions on a rotatable exchangeable filter carrier, said first and second sets of filters being arranged in the same plane.

27. The stereo fluorescence microscope according to claim 21, wherein corresponding movable lenses of the observation beam paths and the illuminating beam path are arranged in common lens carriers.

28. A stereo fluorescence microscope, consisting essentially of:
   an exciter filter;
   a magnification changer;
   an objective;
   at least one illuminating beam path; and
   two stereoscopic observation beam paths,
   wherein the illuminating beam path penetrates the exciter filter, the magnification changer and the objective, wherein the observation beam paths penetrate the magnification changer and the objective, wherein the illuminating beam path and the observation beam paths are parallel, separate and spaced apart from each other within the magnification changer,
   wherein the magnification changer comprises a first set of lenses to change the magnification of the observation beam paths and a second set of lenses to change the magnification of the illuminating beam path.

* * * * *